United States Patent [19]

Pfenninger

[11] Patent Number: 4,889,633

[45] Date of Patent: Dec. 26, 1989

[54] PROCESS FOR TREATING AQUEOUS FLUIDS CONTAINING ORGANIC COMPOUNDS AND SALTS OF POLYVALENT INORGANIC ACIDS

[75] Inventor: Heinz Pfenninger, Lupsingen, Switzerland

[73] Assignee: Ciba-Geigy Corporation, Ardsley, N.Y.

[21] Appl. No.: 227,879

[22] Filed: Aug. 3, 1988

[30] Foreign Application Priority Data

Aug. 5, 1987 [GB] United Kingdom ............... 8718495

[51] Int. Cl.$^4$ .................................. B01D 13/00
[52] U.S. Cl. .................................. 210/639; 210/651
[58] Field of Search .................. 210/639, 651, 652

[56] References Cited

U.S. PATENT DOCUMENTS

| | | | |
|---|---|---|---|
| 4,329,145 | 5/1982 | Koll et al. ................. | 210/651 X |
| 4,584,103 | 4/1986 | Linder et al. ................ | 210/650 |
| 4,690,765 | 9/1987 | Linder et al. ................ | 210/654 |
| 4,690,766 | 9/1987 | Linder et al. ................ | 210/654 |
| 4,758,347 | 7/1988 | Henz et al. ................. | 210/639 |

FOREIGN PATENT DOCUMENTS 0080304 5/1984 Japan ................................ 210/652

OTHER PUBLICATIONS

Pusch et al., Angew. Chem. Int. Ed. Engl., 21, (1982), 660–685.

*Primary Examiner*—Frank Spear
*Attorney, Agent, or Firm*—Wenderoth, Lind & Ponack

[57] ABSTRACT

Aqueous fluids, such as chemical reaction solutions or effluents from chemical production plants or dye houses, containing organic compounds and salts of polyvalent inorganic acids, prefereably sulfates, are adjusted to a pH value in the range below about 4, concentrated by a membrane treatment and separated into an aqueous retentate concentrated with respect to the organic compounds and an aqueous permeate substantially free of organic compounds. Under these strong acid conditions an effective concentration of the organic compounds without the disturbing increase of the osmotic pressure caused by the presence of said salts can be reached. The concentrates can be easily disposed of and the permeates, for example effluents substantially free of any organic compounds can be discharged into a waste water plant for further treatments and purification.

15 Claims, No Drawings

PROCESS FOR TREATING AQUEOUS FLUIDS CONTAINING ORGANIC COMPOUNDS AND SALTS OF POLYVALENT INORGANIC ACIDS

The present invention relates to a process for concentrating an aqueous medium (fluid) containing organic compounds and inorganic salts of polyvalent inorganic acids by subjecting said aqueous medium to a membrane treatment. The organic compounds can be separated in the form of a concentrated retentate that can be easily disposed of. The aqueous medium is preferably a waste water (effluent) from chemical production plants or dye houses, but can also be an aqueous reaction solution containing chemical compounds.

In order to reach the least possible pollution of the environment by effluents it is necessary to optimally purify these effluents before their discharge into water systems.

Such a purification is particularly demanded for aqueous media (effluents) containing organic compounds, such as products or organic by-products from chemical reactions, which have a high chemical oxygen demand (COD).

The application of membrane filtration technology for such concentration purification processes is known. All such membrane methods, however, have proved to be not effective in treating aqueous media (waste waters/effluents) containing besides organic compounds, mostly charged ones, that is of anionic, cationic or amphoteric character, relatively large amounts of salts of polyvalent, preferably di- or trivalent inorganic acids, such as salts of phosphoric and preferably of sulfuric acid.

The reasons for this non-effectiveness of the prior art membrane methods particularly lie in the large amounts of salts of polyvalent inorganic acids, and the strong repulsion by the membranes of compounds containing e.g. double or triple negative charges (sulfates, phosphates), thus increasing the osmotic pressure above the applied pressure and rendering a continuation of the process impossible, the precipitation of solids which would foul the semipermeable membranes, the similar behaviour of e.g. negatively charged organic compounds and a polyvalent, especially a divalent sulfate anion with regard to their transport mechanisms and interactions with the membrane.

Due to the high osmotic pressure the large amounts of salts of polyvalent inorganic acids present in aqueous media require not only a high driving pressure when subjected to a membrane treatment, such as reverse osmosis or ultrafiltration, but also due to the strong repulsion caused by the negative charges a membrane treatment can hardly be performed in an effective manner.

For the sake of clarity the (driving) pressure required must be greater than the osmotic pressure of the aqueous medium (feed) in order to cause liquid (water) and other permeates to flow through the membrane and to increase the concentration of the feed on the high pressure side of the membrane.

Although in the first phase of such a membrane treatment the flux may increase almost in direct proportion to the pressure applied, the flux is reduced considerably after a very short time due to the increase of the salt concentration and the osmotic pressure on the high pressure side. Precipitation of solids which would foul the membranes may also result.

The application of higher pressure would not overcome this decrease in flux but rather would result in physical deformation of and damage to the membranes.

The third main barrier to an entirely satisfactory membrane concentration and purification method which is capable of treating aqueous waste streams of the kind indicated above is the almost similar behaviour in a membrane process of the particular species present in said waste streams. Although there may be organic compounds of higher molecular weight present, most of them are of relatively low molecular weight and ionically charged. The similarity of the transport mechanisms and the interactions with the membrane of a low molecular weight ionic organic compound, e.g. an anionic dye, and a divalent sulfate anion excludes their effective separation.

It is therefore one object of the present invention to provide a feasible and economically advantageous process for concentrating an aqueous medium containing organic compounds and inorganic salts of polyvalent inorganic acids by subjecting said aqueous medium to a membrane treatment.

Another object of the present invention is to provide a process of the type described above which results in a permeate of reduced COD.

Yet another object of the present invention is to provide a process of the type described above which may be used to treat effluents from chemical production plants, dye houses etc., but also aqueous reaction solutions containing mixtures of chemical compounds, in order to separate (an) the organic compound(s) from said mixture.

It has now been found that the above deficiencies of the prior art membrane treatment methods when used to concentrate and purify the aqueous media described herein, can be overcome by the inventive process described and claimed hereinafter. This is accomplished by adjusting the aqueous media to be treated to a certain low pH range.

Therefore, in accordance with one aspect of the present invention a process for concentrating an aqueous medium containing organic compounds and salts of polyvalent inorganic acids is provided by subjecting said aqueous medium to a membrane treatment and separating it into an aqueous retentate concentrated with respect to the organic compounds, and an aqueous permeate substantially free of organic compounds, which comprises subjecting the aqueous medium having a pH value in the range of below about 4 to the membrane treatment.

Another aspect of the present invention relates to the use of the inventive process for removing organic compounds from waste effluents from chemical production plants or dye houses.

The aqueous media to be treated inventively may contain quite different kinds of organic compounds as well as salts. They are mostly effluents or waste waters of chemical production plants, dye houses, textile treatment plants or of other origin. The organic compounds may be of high or relatively low molecular weight (between about 200 and 500), such as ionic (anionic) dyestuffs of for example the mono- or polyazo-, azomethine- or anthraquinone series containing sulfonic acid or carboxy groups; further optical brighteners; and intermediates for making dyes and optical brighteners, such as dinitrostilbenedisulfonic acid, sulfanilic acid, p-nitrotoluenesulfonic acid and the naphthol- and aminonaphtholsulfonic acids (letter acids); heterocyclic compounds such as substituted triazines or pyrimidines. The waste effluents may contain these organic compounds in amounts of from about 10 ppm to about 5% by weight, preferably from about 10 ppm to about 1% by weight, or most usually in the range of about 0.1 to 1% by weight.

The salts of the polyvalent inorganic acids that are present in the aqueous media to be treated inventively are for example water-soluble phosphates or especially sulfates, but may be salts of other polyvalent inorganic acids, too.

The cations of these salts are for example alkali metal cations, preferably $Na^{\oplus}$ and $K^{\oplus}$, ammonium ($NH_4^{\oplus}$) or earth alkali metal cations, preferably $Ca^{\oplus\oplus}$ or $Mg^{\oplus\oplus}$.

The amounts of these salts may vary within wide limits, e.g. between 0.1% by weight up to amounts near the saturation point of the salt, which may be reached at concentrations of about 15 to 40% by weight for the salts involved. Preferably the amounts of salts lie within 0.1 and 20% by weight.

Depending on the origin of the aqueous media (effluents) undissolved impurities have to be filtered off first, then they can be subjected to the membrane treatment without or with a prior pH adjustment. Mineral acids, such as sulfuric acid and hydrochloric are the acids commonly used for such an adjustment.

Waste waters/effluents from chemical production plants, dye houses and textile treatment plants can contain sufficient acid to show pH values below about 4 and need no special pH adjustment, therefore.

As a rule, however, the pH values have to be adjusted in order to reach the preferred pH ranges lieing between 0.1 to 4 and especially between 0.1 and 2. Most preferred are pH ranges within 0.3 to 1.3 and 0.5 to 1.0.

The inventive membrane treatment embraces such processes as ultrafiltration and reverse osmosis, the latter being preferred. Optionally, these membrane processes can be combined with a diafiltration, that is ultrafiltration and reverse osmosis are carried out in a diafiltration mode wherein make-up solvent is added to the retentate to compensate for the solvent passing the membrane as permeate. Diafiltration is used when it is desirable to reduce the salt content of the retentate.

Concerning the membrane technology and the materials and equipment used in the inventive (ultrafiltration-UF/reverse osmosis-RO) process, reference is made to W. Pusch et al., Synthetic Membranes-Preparation, Structure and Application, Angew. Chemie, Int. Ed. 21, 660 (1982).

The membrane material which is employed in the ultrafiltration process according to the present invention comprises acid resistant polymeric (organic) membranes, such as membranes of polyacrylonitriles (US-A-4 584 103), polytetrafluoroethylene, polystyrenes, polyamides, polyimides, polyetherketones and particularly polysulfones (US-A-4 690 765, US-A-4 690 766). Membranes from other materials or polymers are, however, also suitable, provided they meet the predetermined requirements.

More particularly, the inventive process comprises pumping an acidic aqueous solution (feed) of relatively low concentration having an osmotic pressure based on the dissolved organic compounds not too high in order to perform the membrane treatment under reasonable conditions in an economic way into a one or more staged membrane unit containing plate or preferably tubular modules mounted with acid resistant UF, RO or UF/RO membranes.

The temperature of the feed subjected to membrane treatment may vary from 10° to 90° C., preferably from 10° to 60° C., and most preferred from 10° to 40° C., especially for membranes of organic polymers.

The membrane unit is associated with inlet and outlet means and the feed is recycled continuously under a driving pressure of 2 to 100 bar, preferably 5 to 40 bar for UF/RO and most preferred 20 to 40 bar during a period of about 2 to 48 hours and separated into a concentrate (retentate) containing the organic compounds and a permeate containing no or only a minimal amount of organic contaminants but inorganic acids and/or salts.

The content of the organic compounds in the retentate varies with the volume concentration factor (VCF) which is the ratio of the initial feed volume to final retentate volume (at the end of the membrane treatment) in direct proportion.

Depending on the content of the components in the feed and their solubilities the VCF values may vary within wide limits. In order to establish a feasible performance these values are e.g. in the range of greater than 1 (1.1) to up to about 30, preferably within 1.1 and 20.

The concentrates (retentates) obtained contain considerably increased contents of the organic compounds but smaller, equal or only slightly higher contents of salts. This is the surprising result of the inventive process enabling the enrichment of relatively low molecular weight and preferably ionic organic compounds and their separation from aqueous solutions containing salts of polyvalent inorganic acids. Hitherto, such mixtures were considered inseparable by feasible and effective pressure driven membrane processes.

The considerable improvement reached by the inventive process is that the retentate can be easily disposed of, e.g. by wet oxidation or combustion, which cannot be carried out satisfactorily when the salt content is high. On the other hand, the permeate contains no or only minimal amounts of organic compounds (considerably reduced COD value), and can be fed, optionally after its neutralisation, to a waste water plant for further treatments and purification.

The following specific examples illustrate the present invention but are not limiting to it. All references to parts and percentages are by weight unless otherwise indicated.

Dye of formula (1)

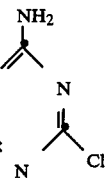
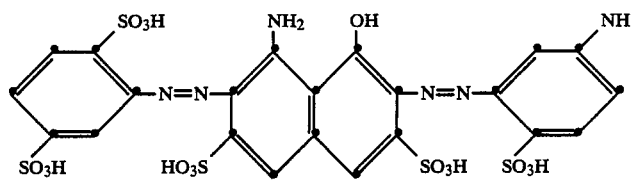

EXAMPLE 1

Waste water containing the dye of formula (1) and sulfate ($SO_4^{2-}$)/hydrogensulfate ($HSO_4^-$) ions is fed to a laboratory reverse osmosis unit containing a tubular module mounted with a polysulfone membrane according to Example 32 of US-A-4 690 765, the membrane area being about 12 cm$^2$.

The waste water is recycled through the module at a pressure of 30 bar at room temperature until the desired concentration of the dye in the retentate is obtained.

The following Table 1 shows the figures of waste water concentration runs carried out at different pH values.

The waste water concentration runs are carried out at different pH values (being adjusted with sulfuric acid) and the volume concentration factor (VCF) is increased during each run from 1 to the figure indicated in Table 1. The flux declines with a growing VCF. The rejection values for the dye and "sulfate" during the reverse osmosis run (from beginning to end) are provided and also the concentrations of dye and sulfate in the final retentate are given.

"sulfate" is used to indicate that the species actually present are e.g. $SO_4^{2-}$, $HSO_4^-$ and others.

Table 1 shows the performing conditions and the results.

The results of Table 1 show that the sulfate concentration in the waste water during reverse osmosis can be kept contant or within a relatively small degree of increase when compared with the degree of concentration reached for the "organic compound". In other words, a high concentrated "organic" retentate can be obtained that can be easily disposed of, e.g. by wet oxidation or cumbustion, without being troubled by a too high salt content. Negative rejection of 'sulfate' means permeation.

The final column of Table 1 conntains the percentages of the dye present in the retentate at the end of the operation, calculated on the weight of the dye at the beginning which is set 100%.

A reduction of the sulfate content, if desirable and necessary can be achieved by continuing the reverse osmosis in a diafiltration mode, that is to add make-up solvent to the retentate to compensate for the solvent passing as permeate.

EXAMPLE 2

As in Example 1 a waste water is treated in a reverse osmosis unit containing 1% of dinitrostilbenedisulfonic acid (DNS), a relatively low molecular weight organic compound (m.w. 430) that could not be concentrated by reverse osmosis in the presence of sulfates. The reverse osmosis unit is run under the conditions according to Example 1. All the details are listed in Table 2.

TABLE 1

| No. of run | pH | feed composition | VCF (from beginning to end) | Flux (1/m$^2$d) (from beginning to end) | Rejection of dye (1) (%) (from beginning to end) | Rejection of 'sulfate'(%) (from beginning to end) | Concentration (final retentate) 'sulfate' | dye (1) (%) |
|---|---|---|---|---|---|---|---|---|
| 1 | 0.5 | 3% of dye (1), 1.009 mol/l of 'sulfate' | 1 to 30 | 329 to 29 | ~100 | 7.2 to −19.7 | 1.009 mol/l | 100 |
| 2 | 1.0 | 3% of dye (1), 0.525 mol/l of 'sulfate' | 1 to 6.2 | 299 to 40 | 100 to 99.9 | 29.1 to −7.3 | 0.612 mol/l | 99.9 |
| 3 | 1.4 | 0.98% of dye (1), 0.40 mol/l of 'sulfate' | 1 to 4.8 | 1632 to 806 | 99.9 to 99.7 | 0 to 19.0 | 0.62 mol/l | 99.69 |
| 4 | 1.5 | 0.93% of dye (1), 0.26 mol/l of 'sulfate' | 1 to 3.1 | 1139 to 910 | 98.3 to 99.2 | 22 to 33 | 0.34 mol/l | 98.6 |
| 5 | 2.0 | 2.9% of dye (1), 0.42 mol/l of 'sulfate' | 1 to 6.8 | 278 to 45 | 99.9 to 99.4 | 63.4 to 57.7 | 1.03 mol/l | 99.33 |

TABLE 2

| No. of run | pH | feed composition | VCF (from beginning to end) | Flux (1/m$^2$d) (from beginning to end) | Rejection (%) (from beginning to end) DNS | 'sulfate' | Concentration (final retentate) 'sulfate' | DNS (%) |
|---|---|---|---|---|---|---|---|---|
| 1 | 0.5 | 1% of DNS, 0.707 mol/l of | 1.3 to 2.4 | 866 to 732 | 97.64 to 99.08 | 22.2 to 16.5 | 0.634 mol/l | 98.6 |

TABLE 2-continued

| No. of run | pH | feed composition | VCF (from beginning to end) | Flux (1/m²d) (from beginning to end) | Rejection (%) (from beginning to end) DNS | Rejection (%) (from beginning to end) 'sulfate' | Concentration (final retentate) 'sulfate' | Concentration (final retentate) DNS (%) |
|---|---|---|---|---|---|---|---|---|
| 2 | 1.0 | 1% of DNS, 0.267 mol/l of 'sulfate' | 1.3 to 2.3 | 822 to 687 | 92.9 to 97.42 | 23.2 to 33.5 | 0.361 mol/l | 96.1 |
| 3 | 2.0 | 1% of DNS, 0.267 mol/l of 'sulfate' | 1.3 to 2.3 | 790 to 591 | 81.29 to 87.15 | 39.0 to 50.0 | 0.388 mol/l | 87.2 |

The results show that best performance is reached at lower pH values, preferably below a pH of 1, and most preferred at a pH of 0.5 in terms of (high) flux, (low) sulfate rejection (good permeation of sulfate through the membrane), and (high) DNS rejection. The final column contains the percentages of DNS present in the final retentate at the end of the operation, calculated on the weight of DNS at the beginning which is set 100%.

I claim:

1. A process for concentrating an aqueous medium containing organic compounds and salts of polyvalent inorganic acids which comprises adjusting the pH value of said medium in the range of below about 4, and subjecting it to a membrane treatment to separate it into an aqueous retentate concentrated with respect to the organic compound, and an aqueous permeate containing inorganic acids and/or salts and being substantially free of organic compounds.

2. The process according to claim 1, wherein the pH of the aqueous medium is 0.1 to below 4.

3. The process according to claim 2, wherein the pH of the aqueous medium is about 0.3 to 1.3.

4. The process according to claim 2, wherein the pH of the aqueous medium is 0.1 to 2.

5. The process according to claim 2, wherein the pH of the aqueous medium is 0.5 to 1.0.

6. The process according to claim 1, wherein the pH is adjusted to a value in the range indicated by adding a mineral acid.

7. The process according to claim 1, wherein the membrane treatment comprises ultrafiltration and/or reverse osmosis.

8. The process according to claim 1, wherein the membrane treatment is carried out with acid resistant polymeric membranes.

9. The process according to claim 8, wherein the membranes are of polyacrylonitriles, polytetrafluoroethylene, polystyrenes, polyamides, polyimides, polyetherketones or polysulfones.

10. The process according to claim 9, wherein the membranes are of polysulfones.

11. The process according to claim 1, wherein the salts of the polyvalent inorganic acids are water-soluble phosphates or sulfates.

12. The process according to claim 11, wherein the salts of the polyvalent inorganic acids are water-soluble sulfates.

13. The process according to claim 1, wherein the organic compounds are dyes, optical brighteners and intermediates for preparing them.

14. The process according to claim 1, wherein the aqueous medium is waste water from chemical plants or dye houses.

15. Method for removing organic compounds from effluents of chemical production plants or dye houses, or from aqueous reaction solutions containing mixtures of organic compounds, by applying the process according to claim 1.

* * * * *